United States Patent [19]
Wollert

[11] 4,119,797
[45] Oct. 10, 1978

[54] VOICE OPERATED SWITCH HAVING AN ACTIVATION LEVEL WHICH IS HIGHER THAN ITS SUSTAINING LEVEL

[75] Inventor: Walter C. Wollert, Campbell, Calif.

[73] Assignee: Technology Development Corporation, Sunnyvale, Calif.

[21] Appl. No.: 811,085

[22] Filed: Jun. 29, 1977

[51] Int. Cl.² ............................................. H04M 1/19
[52] U.S. Cl. ................................ 179/1 VC; 179/1 HF; 307/360; 325/152
[58] Field of Search ........................ 179/1 VC, 1 HF; 325/152; 307/360

[56] References Cited

U.S. PATENT DOCUMENTS 3,849,603 11/1974 Proios ................................ 179/1 VC

FOREIGN PATENT DOCUMENTS 2,323,260 11/1974 Fed. Rep. of Germany ....... 179/1 VC Primary Examiner—George G. Stellar
Attorney, Agent, or Firm—Lowhurst & Aine

[57] ABSTRACT

A switch which is activated by a voice signal which is higher than the normal voice signal but which is sustained by the normal voice signal and which is disabled by the absence of any voice signal much below the normal voice signal for a predetermined period of time. The voice actuated switch is particularly useful inside a high noise environment, such as the mask of a scuba diver or aviator in which the breathing noise is of the same order of magnitude as ordinary speech noise. The voice activated switch includes a HI comparator which provides an activation signal only when a word is spoken above a certain HI loudness level, and a LO comparator which provides a sustaining level when exposed to a signal from noise or voice at a normal level for a selected time interval.

3 Claims, 2 Drawing Figures

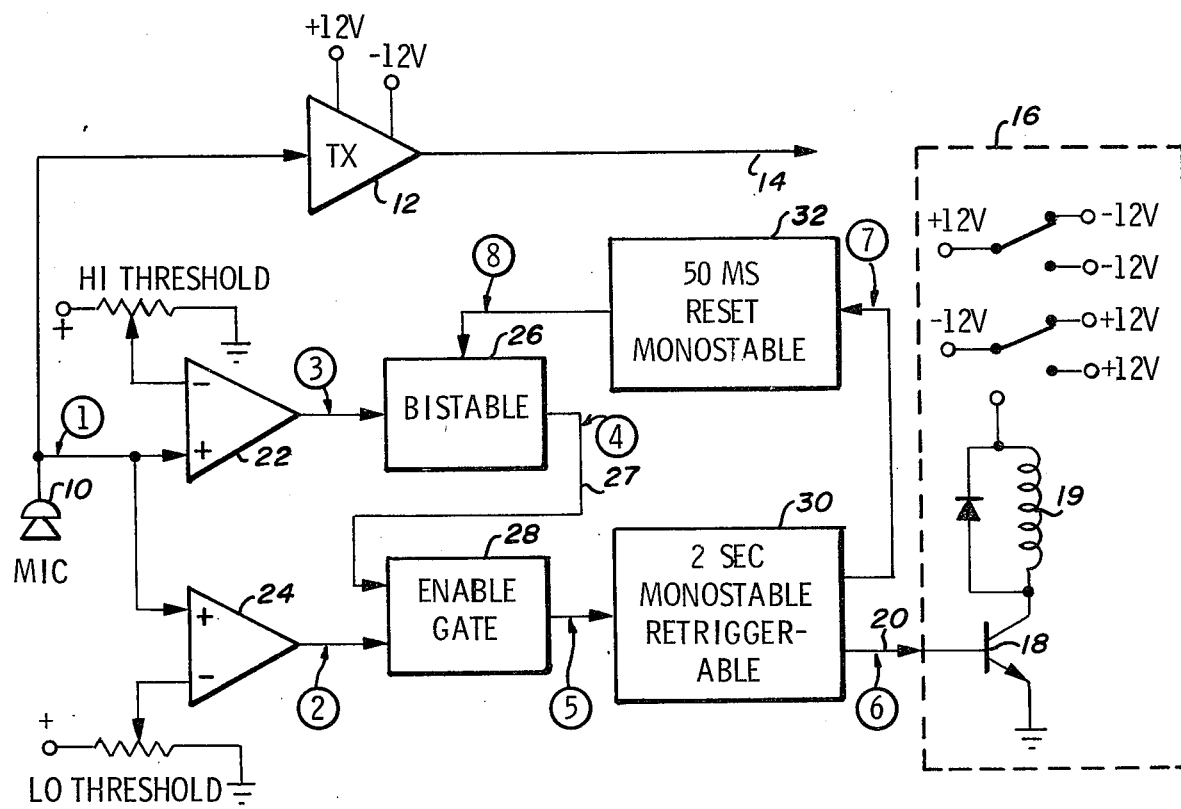
Fig_1
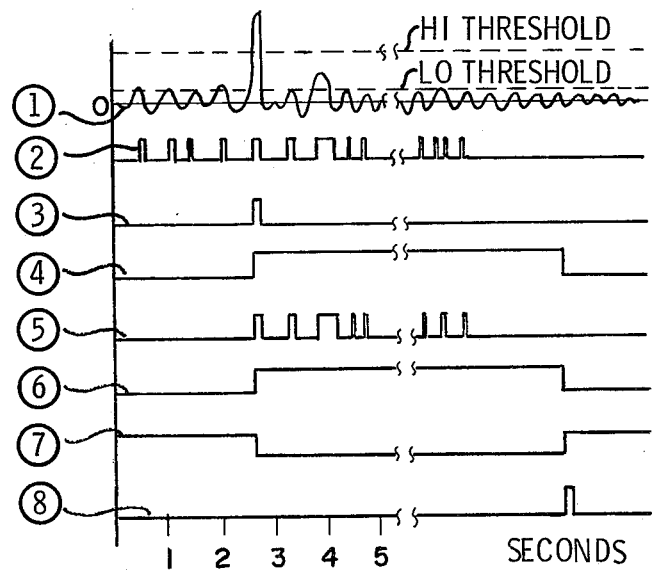
Fig_2

VOICE OPERATED SWITCH HAVING AN ACTIVATION LEVEL WHICH IS HIGHER THAN ITS SUSTAINING LEVEL

BACKGROUND OF THE INVENTION

The present invention relates to voice communication systems in general, and more particularly, to a voice communication system utilizing a voice activated switch which is particularly suited for a communication system for divers and aviators.

The use of voice activated transmit switches (VOX) in communication systems is well known and is desirable because it eliminates manual switching from the receiver to the transmitter. In such systems, the normal voice level output from a speech microphone is used to actuate a circuit which enables the transmitter while at the same time disabling the receiver. The most common method of enabling and disabling is to transfer operation power from the power supply from the receiver to which it is normally connected to the transmitter when the voice actuated switch is keyed.

This type of system is highly susceptible to false keying of the transmitter by non-speech noises because the voice actuated switch usually does not distinguish between non-speech signals and speech signals. The problem of false keying of the transmitter is particularly acute in an underwater communication system where the microphone is located in the diver's mask and therefore exposed to the diver's breathing noises and the gas flow noises. In fact, the loudness of this breathing noise inside the mask, particularly when the diver is working hard, is usually of the same order of magnitude than normal speech noise so that breathing would certainly cause false keying.

One method proposed for eliminating false keying in the use of a voice band-pass filter in the microphone circuit to eliminate non-speech noises, but since breathing noises and gas flow noises have a broad frequency spectrum which extends well into the speech spectrum, such filters seriously degrade the quality of voice communication which is already of a lesser than desired quality because of the special environmental conditions to which both the diver and the equipment are exposed to when underwater.

Another solution proposed to the above-stated problem is the utilization of a separate tissue-conducting (throat) microphone, in addition to the speech microphone located in the mask, which is placed tightly against the throat. It is well known that breathing sounds are not normally heard in the throat so that the output of the throat mike is entirely due to speech and may be utilized to activate and sustain the voice operated switch. This system is disclosed in U.S. Pat. No. 3,746,789 which issued on July 17, 1973. The disadvantages of utilizing a separate tissue conducting microphone to operate the voice actuated switch are several, one being the cost of an additional microphone, particularly of the throat type, another and more serious one being the inconvenience of maintaining a throat mike in tight contact with the throat of the diver when even the slightest pressure on the throat may interfere with normal breathing of the diver. A further disadvantage is that the throat mike is one additional piece of equipment a diver has to wear and to maintain in addition to many others.

It is therefore a primary object of the present invention to provide a voice activated switch which is not keyed by normal environmental noise, such as breathing and gas flow, such as is normally found inside the diving mask of the scuba diver or perhaps in the oxygen mask of a high altitude aviator, but which still permits communication using normal level speech.

It is a further object of the present invention to provide an improved voice actuated switch which is bilevel in that it requires a high voice level to key it on and only a normal voice level to sustain it and which cuts off when the input is substantially below the normal voice level.

It is another object of the present invention to provide a voice actuated switch which is particularly useful in an environment where it is subject to noise at a level equivalent to that of normal speech, but in which the noise can be substantially reduced or even eliminated for at least short times.

SUMMARY OF THE INVENTION

In accordance with the present invention, there is provided a voice actuated switch in which the output of a microphone is applied to a high threshold comparator (HI) and a low threshold comparator (LO). When the microphone output signal exceeds the high threshold, the HI comparator generates a signal which turns on or keys the voice actuated switch. The switch stays in the keyed position as long as the microphone output signal exceeds the low threshold and the LO comparator generates a sustaining signal. When the microphone output signal falls below the low threshold, a condition which is achieved in the absence of normal speech and when breathing is interrupted for a predetermined short period of time, the LO comparator no longer provides a sustaining signal and the switch turns off after a selected time interval.

BRIEF DESCRIPTION OF THE DRAWINGS

FIG. 1 is a schematic block diagram of the voice actuated switch of this invention; and FIG. 2 is a waveform diagram of the signals at various points of the schematic block diagram of FIG. 1.

DETAILED DESCRIPTION OF THE INVENTION

Referring now to FIG. 1 of the drawing, there is shown a preferred embodiment of the voice operated switch of the present invention. A microphone 10 has sounds applied to it, in the form of noise or voice, and generates a sound signal which is applied to a transmitter 12 for transmission over a communication link as indicated by line 14 when the transmitter 12 is keyed on. There is also shown a switch 16 which includes a transistor 18 for actuating a relay 19 for transferring power from a power supply (not shown) from the receiver (not shown) which is usually connected to the power supply to the transmitter when the voice actuated switch of this invention is turned on. Or, conversely, when the voice actuated switch of this invention is keyed on, it applies a signal to lead 20, connected to the base of transistor 18, and turns on the transistor so that a current flows through the solenoid which energizes relay 19 to transfer power from the receiver to the transmitter.

The output signal from microphone 10 is also applied to a pair of threshold comparators 22 and 24. Comparator 22 is the HI comparator which provides an output signal only when the input is above a HI threshold and comparator 24 is the LO comparator which provides an output signal only when the input is above a LO threshold. The output of HI comparator 22 is applied to a bistable device 26 which high output line 27 is connected to an enable gate 28 which remains open as long as bistable device 26 is in the high position. The term "high" and "low" are used herein to indicate, respective, a "set" and "reset" condition. The output from LO comparator 24 is passed through enable gate 28 to a monostable device 30 who has its high output terminal connected to base lead 20 of transistor 18. The low output terminal of device 30 is connected to a monostable multivibrator 32 to trigger the same when monostable device 30 changes its position to low. The output of monostable device is used to reset bistable device 26 to change to low positions and thereby close enable gate 28 when device 32 is triggered.

In operation, when the diver or pilot breathes and speaks into his mask, the sounds within the mask are picked up by microphone 10 which develops an electrical signal like the one shown in waveform 1 of FIG. 2. Assuming initially that transmitter 12 is disabled, the sounds applied to the microphone would not be transmitted. If the output signal from the microphone reflects a normal speech or breathing level, and the low threshold of comparator 24 is set slightly below that level, LO comparator 24 will provide an output pulse every time the microphone signal is greater than the threshold signal as shown in waveform 2 in FIG. 2. If the diver or the pilot shouts a throw-away word such as "start", and the high threshold is set below the signal level of a shout, then HI comparator 22 provides an output pulse each time the microphone receives a loud spoken word as illustrated in waveform 3. As can be seen from the waveforms 1, 2 and 3, normal voice and noise produce output pulses from LO comparator 24 which have a width equal to the duration of the signal above the low threshold level, and loudly spoken words produce output pulses from the HI comparator 22 which have a width equal to the duration of the signal above the high threshold level and also output pulses from the LO comparator 24.

As long as enable gate 28 is closed, and it is normally closed, the output pulses from comparator 24 cannot pass to trigger monostable multivibrator 30 and the same remains in the reset position. However, when comparator 22 provides an output pulse, bistable device 26 is set which, in turn, opens enable gate 28 and allows the pulses from LO comparator 24 to set monostable multivibrator 30 which, in turn, turns on transistor 18 and transfers power from the receiver to the transmitter through relay 19. Waveform 4 of FIG. 2 illustrates the high output of bistable device 26 in response to the pulse from comparator 22. Waveform 5 of FIG. 2 illustrates the passage of pulses from comparator 24 to continually set monostable vibrator 30 and waveform 6 illustrates the state of monostable device 30 and the application of current to the base of transistor 18. Normally, monostable device 30 is high for a normal switch off time which is typically from 1 to 20 seconds.

When the diver or pilot desires to deactivate the switch of this invention, he is silent and holds his breath for a time sufficient to allow monostable device 30 to revert to its low or reset position. For diving it has been found that a 2 second delay is emminently suitable for switching off the voice actuated switch of the invention and yet not a strain on the diver when he holds his breath. Even times up to 5 seconds are quite comfortable to the average diver. When monostable 30 switches back to its reset or low position, as illustrated in waveform 7 of FIG. 2, in response to the absence of any output from low threshold comparator 24, it also sets monostable 32 which usually has a very short delay time, say 50 milliseconds, and which in turn resets bistable device 26 into its low position. This is illustrated in waveform 8 of FIG. 2.

As a practical matter, the LO threshold comparator 24 is set so that normal voice and normal breathing will provide output pulses to sustain the switch, i.e., keep monostable device 30 in the set position, once it is keyed. HI threshold comparator 22 is usually set that it requires a throw-away word, spoken loudly but not necessarily shouted, to set the switch, i.e., set bistable device 26. While it takes very little energy to loudly speak one word to activate the switch, it would take considerable energy if the switch were sensitive only to loud speech which would easily tire the diver or the pilot and also may cause a sore throat.

There has been described in here a two-level voice actuated switch, a high level sound activates the switch and a lower level sound sustains the switch. Low level sound may comprise unavoidable background noise such as breathing and air supply noises, or ordinary voice to form speech. In this manner pulse keying is avoided and the voice actuated switch may be tailor made to a particular user by enabling him to set the low and the high threshold to suit his particular convenience.

What is claimed is:

1. In a voice communication system having a transmitter and a speech microphone acoustically coupled through a gaseous medium to a speech source system for generating a modulation system for said transmitter, a voice activated transmit switch for turning on the transmitter comprising:

first means responsive to the output signal from said microphone and operative to provide first output pulses when the amplitude of said microphone output signal is above a predetermined "high" threshold;

second means responsive to said microphone output signal and operative to provide second output pulses when the amplitude of said microphone output signal is above a "low" threshold level;

bistable means responsive to said first output pulses and operative to switch its state;

gating means responsive to the state of said bistable means and operative to gate said second output pulses; and monostable means responsive to said gated second output pulses and operative to enable the transmitter, said monostable means remaining "on" for a predetermined length of time.

2. In a voice communication system in accordance with claim 1 which further includes a reset means responsive to said monostable means and operated to provide a reset signal when said monostable means resets, said bistable means being responsive to said reset signal and operative to change its state and to thereby disable said gating means, said reset means being a monostable device.

3. In a voice communication system in accordance with claim 1 in which said predetermined time is selected in accordance with the maximum length of acceptable speech pauses.

* * * * *